UNITED STATES PATENT OFFICE.

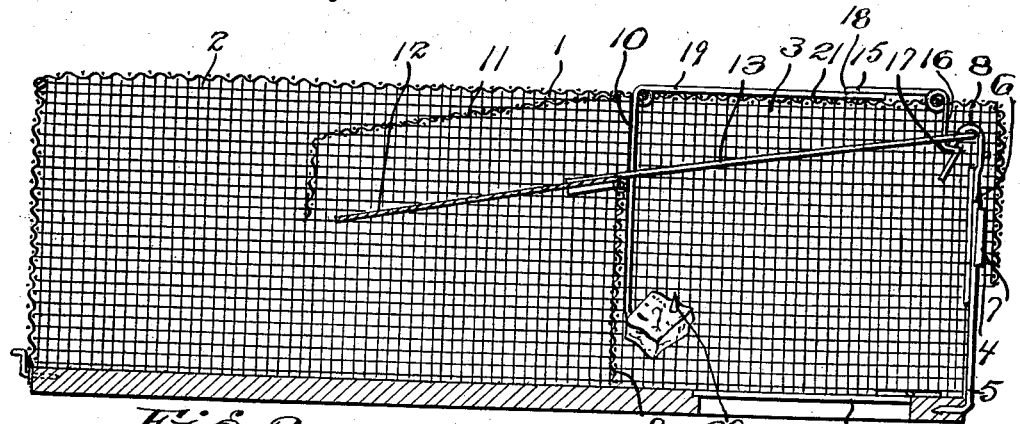
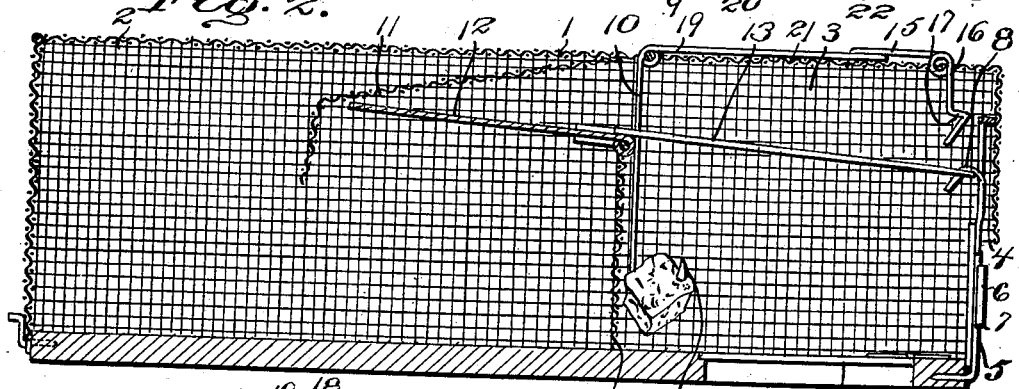
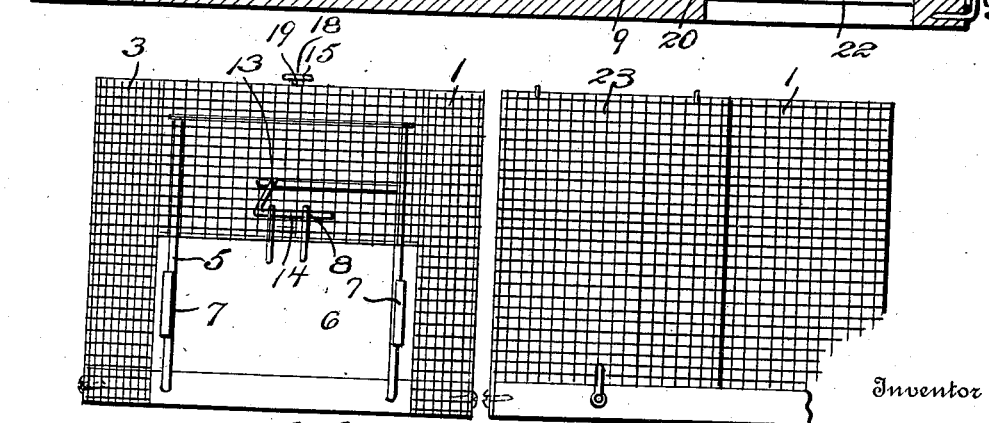

FREDERICK BROCKER, JR., OF NEW YORK, N. Y.

VICTIM-SET RAT OR MOUSE TRAP.

1,012,801.  Specification of Letters Patent.  Patented Dec. 26, 1911.

Application filed April 15, 1911. Serial No. 621,416.

*To all whom it may concern:*

Be it known that I, FREDERICK BROCKER, Jr., citizen of the United States, residing at New York, in the county of New York and State of New York, have invented certain new and useful Improvements in Victim-Set Rat or Mouse Traps, of which the following is a specification.

This invention relates to a victim set rat or mouse trap, and has for its object to provide a trap of simple structure which includes a body comprising a pound and an entrance. In the entrance are located tripping devices for permitting a door to fall after the animal has entered, and upon the partition between the entrance portion and the pound is provided a pivoted platform, upon which the animal must pass in its endeavor to escape and as it does so its weight will cause the said platform to swing, whereby the animal is precipitated into the pound and at the same time the entrance door is moved to open position and is so held until it is lowered by another animal subsequently actuating the tripping mechanism.

For a full understanding of the invention reference is to be had to the following description and accompanying drawings, in which:

Figure 1 is a longitudinal sectional view of the trap, showing the parts in one position; Fig. 2 is a similar view of the trap, showing the parts in another position; Fig. 3 is an elevation of one end of the trap, and Fig. 4 is an elevation of the other end of the trap, with a part broken away.

Corresponding and like parts are referred to in the following description and indicated in all the views of the accompanying drawings by the same reference characters.

The trap includes a body 1, which is provided at one end with a pound 2 and at its other end with an entrance portion 3. An opening 4 is provided at one end of the entrance portion and at the sides of the said opening vertically disposed guides 5 are located. A door 6 having at its side edge portions sleeves 7 or equivalent devices is arranged to open and close over the entrance opening 4. The sleeves 7 receive the guides 5, and the said door 6 is provided at its upper edge with an inwardly disposed portion or member 8. In the partition 9 between the entrance part 3 and pound 2 of the trap is provided an opening 10 over which is located a hood 11 which projects from the partition 9 into the pound 2. A platform 12 is hingedly attached at one edge with the partition 9 and normally closes the hood 11. A rod 13 is fixed to the platform 12 and extends to within close proximity of the door 6 where it is provided with a laterally disposed extremity 14, in the path of movement of which the member 8 of the door 6 is located. A trip 15 is pivoted to the top of the body 1 and has an end portion 16 extending down into the entrance part 3 of the trap and provided with an angularly disposed extremity 17, which at times is projected into the path of movement of the member 8 of the door 6 and is adapted to hold the said door in elevated position. The major portion of the trip 15 lies upon the top of the body 1 and extends from its point of pivotal connection with the said body back toward the partition 9 and terminates in a laterally disposed extremity 18. A hook 19 is pivotally connected at an intermediate point to the top of the body 1 and hangs down within the entrance portion 3 of the said body. The hook extremity 20 of the said hook member 19 is located in the vicinity of the partition 9. The upper portion of the hook 19 is pivoted to the top of the body 1 and is disposed toward the door 6, as at 21. The said portion 21 of the hook lies under the laterally disposed extremity 18 of the trip 15. If desired the bottom of the body 1 may be provided with a hinged door 22, through which the bait may be inserted to be placed upon the hook extremity 20. The pound 2 is provided at that end remote from the partition 9 with a movable door 23, through which the animals may be extracted from the said pound.

In operation, a bait having been placed upon the extremity 20 and the door 6 lifted so that its lug 8 engages the extremity 17 of the catch 15, the trap is in set condition. The animal then endeavors to get at the bait upon the extremity 20 and enters the opening 4 of the entrance portion 3 of the body. When it grasps the bait upon the extremity 20 of the hook 19 it will attempt to back out of the opening 4 and carry with it the bait. This will swing the hook 19 so that its upper portion 21 will move in an upward direction and lift the extremity 18 of the trip 15. Therefore the said trip will turn upon its pivotal connection with the top of the body 1 and the angular extremity 17 is carried from under the lug 8 and by gravity the door 6 falls and closes the opening 4. Thus the animal is trapped and it will seek to make an escape, but inasmuch as it cannot retreat through the opening 4 it will endeavor to pass out of the entrance portion 3 through the opening 10 in the partition 9. It will then move on the platform 12 and swing the same so that it is precipitated down into the pound 2, in which it is effectually entrapped. At the time that the platform 12 swings, the rod 13 is swung in an upward direction and the extremity 14 thereof encounters the lug 8 of the door 6 and lifts the said door so that the said lug brushes past the angularly disposed extremity 17 of the trip 15 and lodges upon the same, whereby the door is held in elevated position. In the meantime the animal has passed off of the platform 12 and under the weight of the rod 13 the said platform closes against the lower edge of the hood 11 and the angular extremity 14 of the rod moves down toward the lower edge of the door 6, which is now in elevated position. Therefore it will be seen that in consequence of the movement of the animal in the body of the trap the parts are reset and by reason of the fact that the animal will seek to make an escape as soon as it realizes that the door 6 is closed, it will cease to attempt to devour the bait, and the same bait may therefore be used for an indefinite number of times.

Having thus described the invention, what is claimed as new is:

1. A trap, comprising a body divided by a partition into an entrance portion and a pound, the entrance portion being provided with an inlet opening and the partition having an opening which establishes communication between the two said portions, a door slidably mounted at the inlet opening of the entrance portion for vertical movement and having an inwardly disposed lug, a trip pivoted at the top of the body and having an angularly disposed extremity which normally lies in the path of movement of said lug and provided at that portion which is located above the top of the body with an angularly disposed extremity, a hook pivoted at the top of the body and hanging pendent within the entrance portion thereof and having a portion lying upon the top of the body and extending under the last mentioned angularly disposed extremity of the trip, a hood mounted upon the partition over the opening therein and projecting into the pound, a platform hingedly attached to the partition and normally closing said hood, and a rod fixed to said platform and extending toward the door and having an angularly disposed portion which projects into the path of movement of the lug upon the door.

2. A trap, comprising a body having an inlet opening, a door slidably mounted at said opening for vertical movement and having an inwardly disposed lug, a trip member pivoted at the top of the body and having an angularly disposed extremity at one end normally located in the path of movement of said lug and provided at its other end and above the body with an angularly disposed extremity, a hook pivotally supported at the top of the body and hanging pendent within the same and provided with a portion lying above the top of the body and extending under the last mentioned angularly disposed extremity of the trip member.

In testimony whereof, I affix my signature in presence of two witnesses.

FREDERICK BROCKER, JR. [L. S.]

Witnesses:
ERNEST BROCKER,
JACOB SCHEIMEISTER.

---

Copies of this patent may be obtained for five cents each, by addressing the "Commissioner of Patents, Washington, D. C."